United States Patent
Chan et al.

(10) Patent No.: US 8,141,070 B2
(45) Date of Patent: Mar. 20, 2012

(54) BRIDGING CLASS LOADER NAME SPACES

(75) Inventors: Sheldon Y. Chan, Somerville, MA (US);
Andrew E. Davis, Arlington, MA (US);
Keith A. Kimball, Hollis, NH (US);
Melaquias E. Martinez, Boylston, MA (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 11/136,643

(22) Filed: May 24, 2005

(65) Prior Publication Data

US 2006/0271922 A1 Nov. 30, 2006

(51) Int. Cl.
*G06F 9/44* (2006.01)
*G06F 9/445* (2006.01)

(52) U.S. Cl. ........................ 717/166; 717/167
(58) Field of Classification Search ........................ None
See application file for complete search history.

(56) References Cited

U.S. PATENT DOCUMENTS

| | | | |
|---|---|---|---|
| 5,983,019 A | 11/1999 | Davidson | |
| 6,282,703 B1 | 8/2001 | Meth et al. | |
| 6,711,579 B2 | 3/2004 | Balakrishnan | |
| 2001/0037417 A1* | 11/2001 | Meyer | 709/332 |
| 2002/0092000 A1 | 7/2002 | Srivivasan et al. | |
| 2003/0105883 A1 | 6/2003 | Gibbons | |
| 2003/0177484 A1* | 9/2003 | Bosschaert et al. | 717/166 |
| 2004/0015849 A1 | 1/2004 | Sanchez, II | |
| 2004/0049776 A1* | 3/2004 | Fomenko et al. | 719/328 |
| 2004/0060058 A1 | 3/2004 | Liang et al. | |
| 2004/0068733 A1 | 4/2004 | Longbardi | |
| 2004/0068735 A1 | 4/2004 | York et al. | |
| 2004/0148609 A1 | 7/2004 | Jimenez et al. | |

* cited by examiner

*Primary Examiner* — Chuck Kendall
(74) *Attorney, Agent, or Firm* — Steven M. Greenberg, Esq.; Carey, Rodriguez, Greenberg & O'Keefe

(57) ABSTRACT

Embodiments of the present invention provide a method, data processing system and computer program product for bridging class loader name spaces. In one embodiment, a data processing system can be provided for bridging class loader name spaces. The data processing system can include multiple, different class loaders disposed within a single run-time environment. The data processing system further can include a class loader bridge programmed to moderate access to the different class loaders in response to a request to load an object from one of two programming models containing objects concurrently in the single run-time environment.

16 Claims, 4 Drawing Sheets

BRIDGING CLASS LOADER NAME SPACES

BACKGROUND OF THE INVENTION

1. Field of the Invention

The present invention relates to the execution of computer code components in a run-time environment and more particularly to class loaders in a run-time environment.

2. Description of the Related Art

The class loader mechanism forms part of the foundation of the modern, virtual machine. In particular, class loaders provide the translation technology which can convert serialized byte code into named classes for execution in the virtual machine. Notably, class loaders can perform this conversion regardless of the storage means and location of the byte code. As a result, the virtual machine need not know the operational specifics associated with the file systems storing the byte code.

In conventional runtime environments like the Java™ runtime environment (Java is a trademark of Sun Microsystems of Palo Alto, Calif., United States), classes can be introduced when they are referenced by name in a class that already is executing within the runtime environment. While the entry point class of an application can require some individual processing exclusive of the class loading mechanism, subsequent attempts at loading other classes are performed exclusively by the class loader.

At its simplest, a class loader creates a flat name space of class bodies that are referenced by a string name. For example, in the case of the Java runtime environment, a class loading definition might include:

CLASS MYCLASS=LOADCLASS(STRING CLASSNAME,BOOLEAN RESOLVECLASS)

In this exemplary implementation of the loadClass( ) method, the variable className encapsulates a string which is understood by the class loader to uniquely identify a stored class implementation. The variable resolveclass, by comparison, is a flag which when set notifies the class loader that classes referenced by the class associated with the class name should be resolved. That is, any class referenced by the class associated with the class name should be loaded as well.

In the Java runtime environment, the Java virtual machine (JVM) can include one class loader embedded within the virtual machine. Referred to as the "primordial" class loader, this embedded class loader automatically resolves references to class names by reference to a specified repository of trusted classes which can be run by the virtual machine without verification. Notably, in the primordial class loader, a default implementation of the loadClass( ) method can be implemented.

The class loader generally is responsible for resolving a type within a given name space to an implementation of a class, and for loading the class into the virtual machine. If the same, identical type is loaded into two different name spaces through different class loaders, as represented by two different class instances, the type checking semantics of the environment inherently defines those types as incompatible. In consequence, a class case exception can be thrown.

As it is well-known in the art, different programming models can exist within a single run-time environment. Exemplary programming models can include a Java version 2.0 Enterprise Edition (J2EE) container and an Eclipse tools platform. Yet, each model can utilize different class loading semantics. In consequence, when it is necessary for the different programming models to interoperate with one another, exchange information with one another, and share services with one another within the same virtual machine, it can be necessary to bridge the name spaces in a manner to avoid class cast exceptions and to minimize the incurred communications overhead.

Specifically, when attempting to run components designed for different programming models inside a single virtual machine, it can be necessary to isolate and re-create the class loading semantics of the original model to enable the components to run unmodified. Isolating and re-creating the class loading semantics of the original model to enable component to run unmodified can be problematic, however. Also, altering the class loading semantics for the components of an application can require the componentization and deployment of the application in each of the environments in order to correctly load the shared interfaces from a common class loader. Of course, to do so can negate the goal and cost savings of not altering the existing programming models.

BRIEF SUMMARY OF THE INVENTION

Embodiments of the present invention address deficiencies of the art in respect to class loading of components in different program models and provide a novel and non-obvious method, system and apparatus for bridging class loader name spaces. In one embodiment, a data processing system can be provided for bridging class loader name spaces. The data processing system can include multiple, different class loaders disposed within a single run-time environment. The data processing system further can include a class loader bridge programmed to moderate access to the different class loaders in response to a request to load an object from one of two programming models containing objects concurrently in the single run-time environment.

The class loader bridge can be programmed to proxy objects across a class loader boundary between different ones of the class loaders disposed in the run-time environment. The class loader bridge also can be defined using recursion by one of passing an object having a base type across the class loader bridge unaltered and by serializing the object across the class loader bridge. Finally, an invocation handler can be coupled to the class loader bridge and programmed to invoke the class loader to bridge arguments to a method in an object proxied by the class loader bridge.

In another embodiment, a method for bridging class loader name spaces can include receiving a request to load an object in a run-time environment. A type for the object can be identified. Subsequently, a class loader can be selected from among a multiplicity of class loaders based upon the identified type in the run-time environment to process the request. The selecting step can include recursively passing the object unaltered across a class loader boundary where the identified type is a type loaded by a shared parent class loader. The selecting step also can include serializing the object across a class boundary, and de-serializing the object in a selected class loader.

The selecting step yet further can include determining if the object is proxiable across a class loading boundary between the class loaders. In this regard, the determining step can include determining if the object implements a common interface that can be resolved within each of the class loaders. If it is determined that the object is proxiable across the class loading boundary, access to the object can be proxied from one namespace for one of the class loaders to another namespace for another of the class loaders.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for bridging class loader name spaces in a virtual machine. In accordance with an embodiment of the present invention, multiple different class loaders for different programming models can be disposed concurrently in a single virtual machine. A class loader bridge can moderate access to the class loaders for loading component objects for each of at least two of the different programming models in the virtual machine. In this regard, upon invocation the class loader bridge can be programmed to select among the class loaders for creating an instance of an application object.

The class loader bridge can be disposed within or in association with a virtual machine. The virtual machine can be a JVM and can include two or more programming models supporting the operation of a set of objects for an application. The programming models can include, for example, J2EE container and an Eclipse tools platform. In particular, the class loader bridge can include a generic library which can dynamically bridge isolated class loader name spaces in the virtual machine. As such, the class loader bridge can enable the embedding of the different class loading models within the same virtual machine, without altering the class loading models.

The class loader bridge can be programmed to handle several scenarios for bridging class loaders across different class loader name spaces in a single virtual machine. Specifically, to the extent that an object is to be loaded across a class loader boundary, if the object is an instance of a type supported by a shared, parent class loader, the object within the first class loader name space can directly reference the instance of the object in a different class loader name space in the virtual machine.

Figure 1:
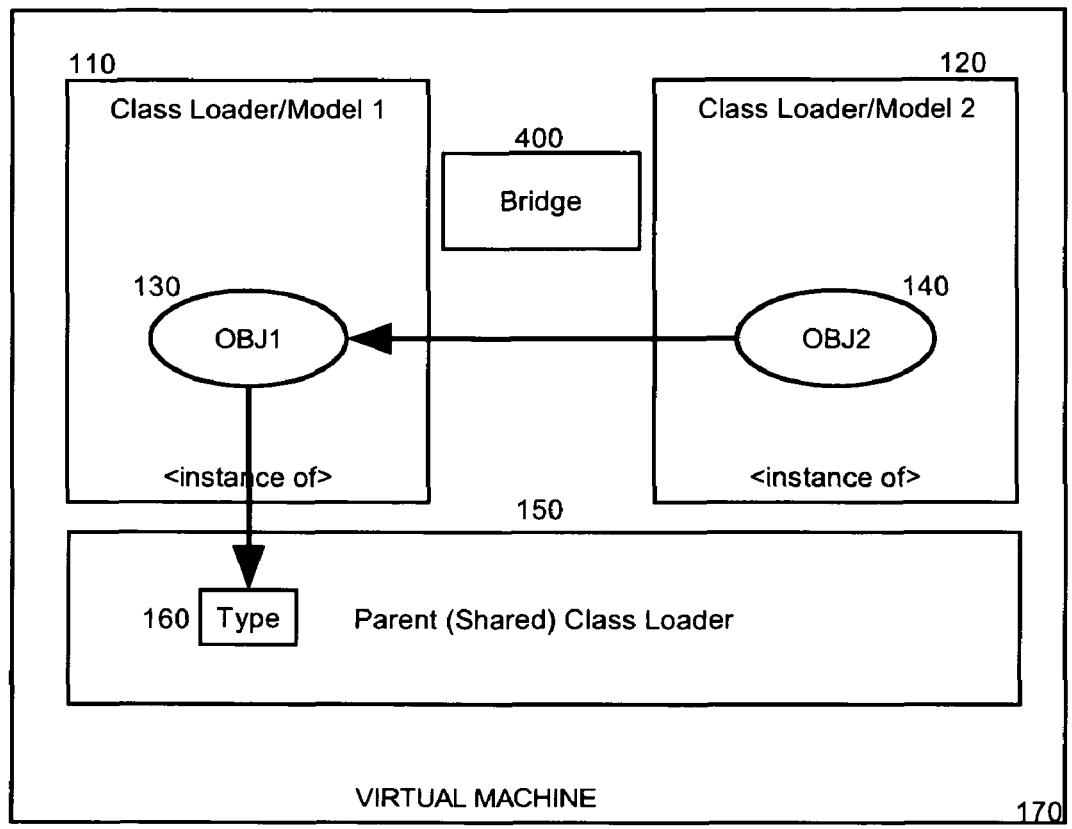
FIG. 1 is a schematic illustration of a virtual machine configured to bridge class loader name spaces.

In more particular illustration, FIG. 1 is a schematic illustration of a virtual machine 170 configured with a class loader bridge 400 to bridge class loader name spaces 110, 120 for different programming models where an object 130 to be accessed within one class loader name space 110 by an object in another class loader name space 120 is an instance of type 160 supported by a shared, parent class loader 150. The case where the object 130 is of a type 160 loaded by a shared parent class loader 150 is the common case for all primitive types that are loaded by the system class loader. Consequently, in this circumstance, bridging will not be necessary.

Figure 2:
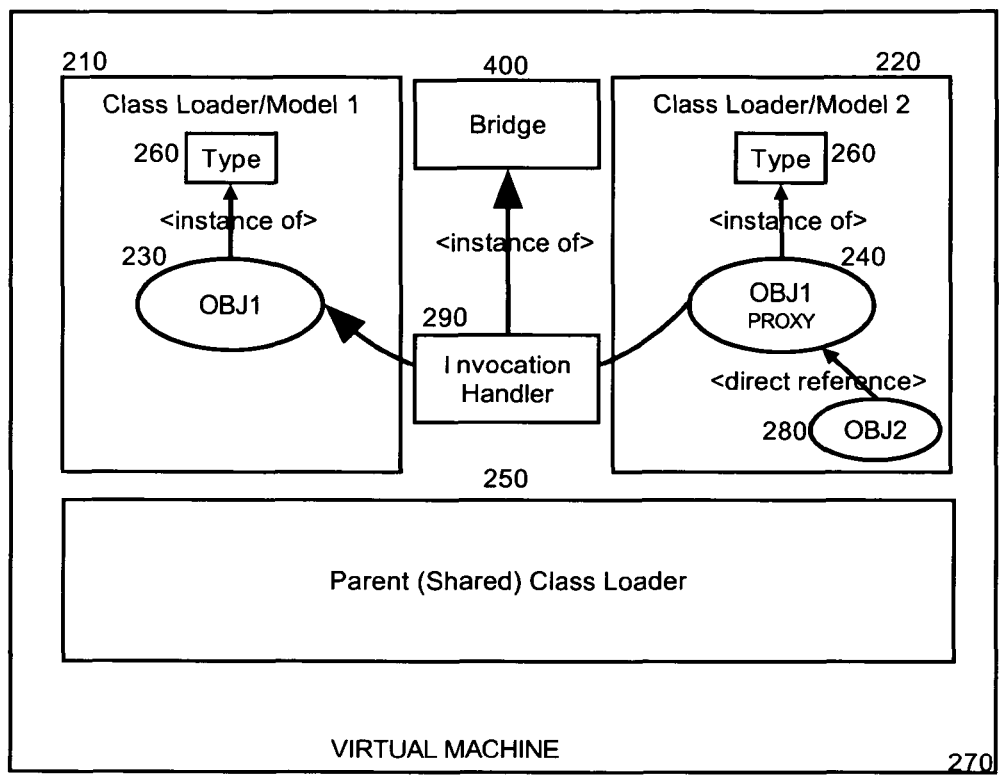
FIG. 2 is a schematic illustration of a virtual machine configured to bridge class loader name spaces.

FIG. 2, by comparison, is a schematic illustration of a virtual machine 270 configured with a class loader bridge 400 to bridge class loader name spaces 210, 220 where the object 230 to be accessed is proxiable across the class loader boundary. Specifically, an object is "proxiable across the class loading boundary", if it implements a common interface or set of interfaces that are resolvable within each class loader. This determination can be made at runtime using reflection to dynamically inspect the object, to identify the interfaces of the source object and to query the destination class loader using standard class loading mechanisms. Moreover, this determination can be optimized by explicitly declaring or passing in meta-data that declares types to be proxiable, albeit to do so requires that all the proxiable types be known statically.

In any event, as shown in FIG. 2, an object 280 in a first class loading name space 220 attempting to access the object 230 in a different class loading name space 210 can utilize a direct reference to a proxy 240 for the object 230. The proxy 240 can be an instance of the same type 260 as the object 230. Yet, the proxy 240 can pass communicative interactions with the object 230 on behalf of the object 280 through an invocation handler 290 which can be an instance of the class loading bridge 400. The accessing of members of the object 230 on behalf of the object 280 can occur through the proxy in the same way that remote method invocation operates as it is well known in the art.

Figure 3:
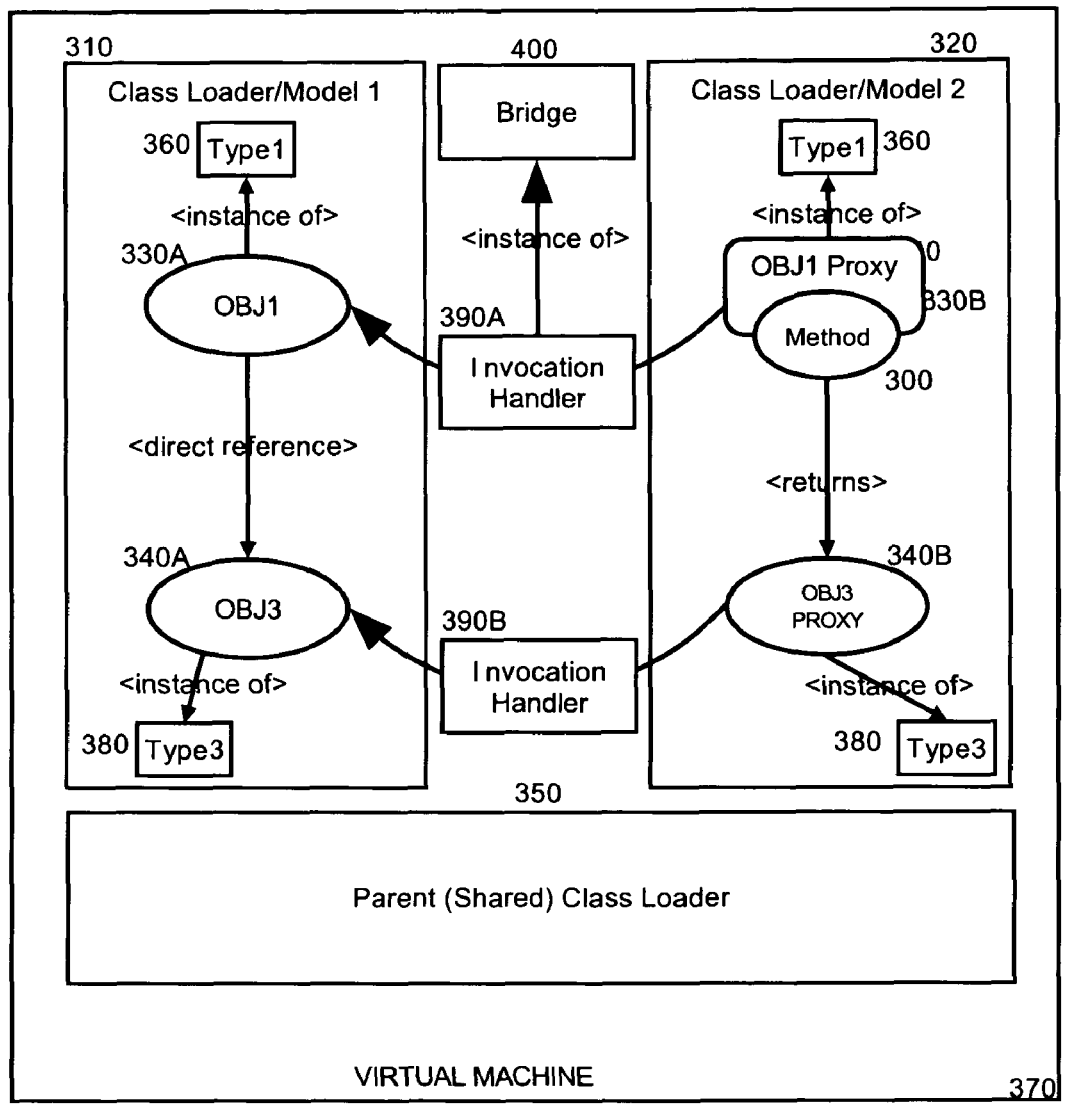
FIG. 3 is a schematic illustration of a virtual machine configured to bridge class loader name spaces; and, FIG. 4 is a flow chart illustrating a process for bridging class loader name spaces.

Finally, FIG. 3 is a schematic illustration of a virtual machine 370 configured with a class loader bridge 400 to bridge class loader name spaces 310, 320 where recursive loading of other objects 340A is required. In general, the usage pattern for the class loader bridge 400 in this circumstance is that an object 330A is explicitly passed across the class loading boundary via an invocation handler 390A instance of the class loading bridge 400 to form a point of communication. This object 330A can be proxiable, and the resulting proxy 330B which can be an instance of the same type 360 as the object 330A can be used by the consumer or client.

Method 300 invocations by the client pass through the proxy 330B via an invocation handler 390A that invokes the class loader bridge 400 to bridge any arguments to the method 300. The method is then performed on the target object 330A within the destination class loader name space 310, and the result can be returned to the invocation handler 390A, which in turn can use the class loader bridge 400 to bridge the resulting object or objects. To the extent that the returned result of the invoked method 300 is a reference to another object 340A which must be proxied across the class loader boundary, a proxy 340B can be created for the returned object 340A so that both the proxy 340B and the returned object 340A are both instances of the same type 380. As before, an invocation handler 390B can manage interactions across the class loader boundary.

Figure 4:
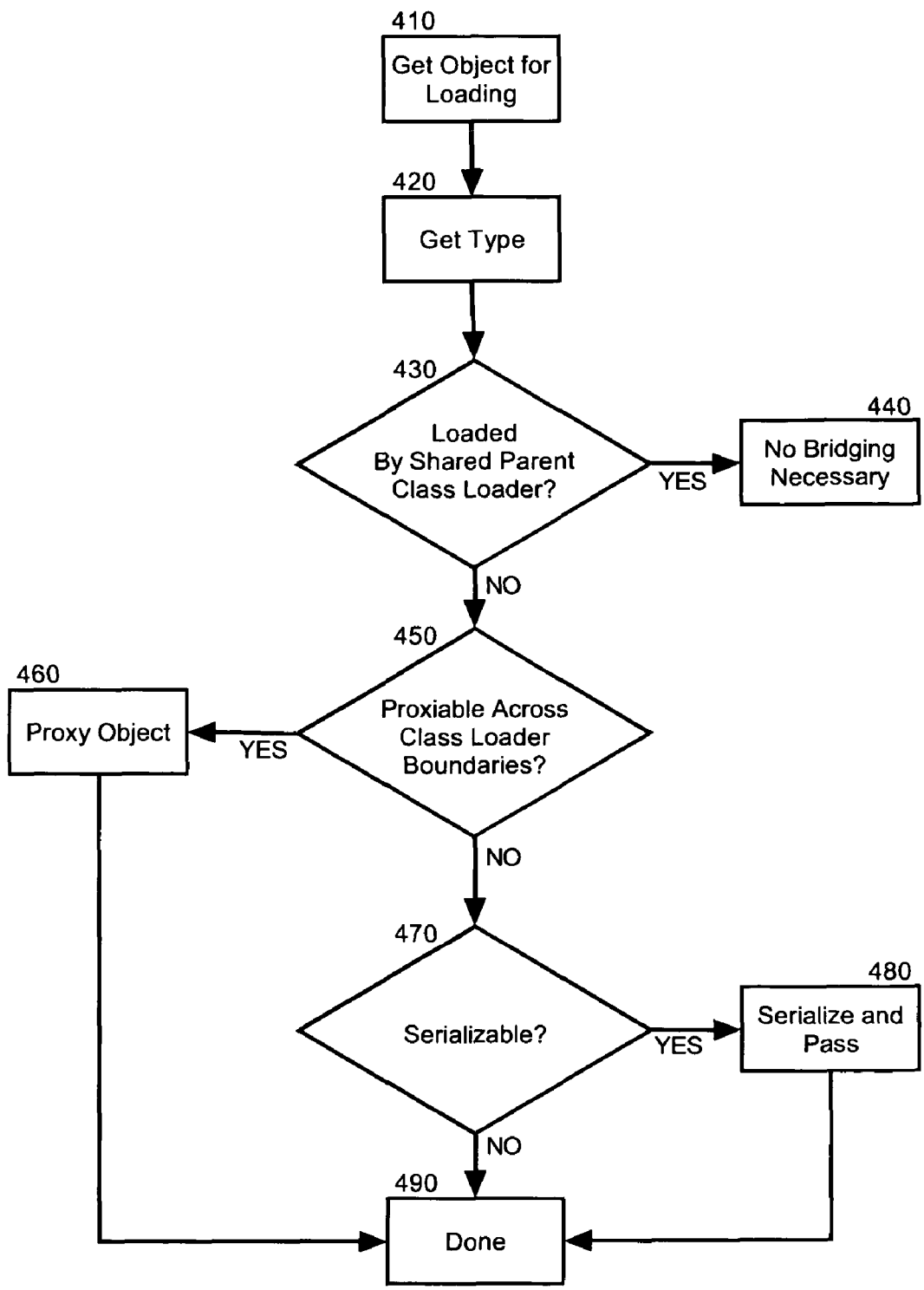

In illustration of the operation of the class loader bridge 400, FIG. 4 is a flow chart illustrating a process for bridging class loader name spaces. In block 410, an object can be retrieved for processing and loading. In block 420, the object type can be identified. Subsequently, the retrieved object can be processed for class loading by the class loading bridge. In this regard, the class loader bridge can be implemented recursively according to three different selectable sub-methodologies which when executed can bridge objects between the different class loaders in the virtual machine.

First, in decision block 430, it can be determined if the object is of a type loaded by a shared parent class loader. The case where the object is of a type loaded by a shared parent class loader is the common case for all primitive types that are loaded by the system class loader. Consequently, in this circumstance, bridging will not be necessary. Thus, if the object is of a type loaded by a shared parent class loader, in block 440 the object can be passed across the class loader boundary unaltered. Otherwise, the process can continue in decision block 450.

In decision block 450, it can be determined if the object is proxiable across the class loading boundary. Proxying of the object across the bridge is desired when interacting with services or components in any form of bi-directional communication, and in general Java objects built according to standard object oriented and design pattern practices which are sufficiently abstracted to be proxied across the class loading boundary Accordingly, in decision block 450 if it is determined that the object is proxiable across the class loading boundary, in block 460, the object can be proxied with the class loading bridge to recursively bridge the resulting objects. Otherwise, the process can continue through decision block 470.

In decision block 470, it can be determined if the object is serializable. If the object is serializable, in block 480 the object can be serialized to a byte stream and de-serialized within the destination class loader. This serialization of the object is directly equivalent to the manner in which Java Remote Method Invocation (RMI) library communicates between two Java virtual machines, without the high overhead costs of sockets and cross process communication.

In the serialization process, the content of an object can be written to a byte level representation and then re-read by the destination class loader. This serialization performance can be made equivalent to simply a cloning of the original object within the destination class loader, depending on the complexity of the object or virtual machine defined serialization routines. In any event, in block 490 the process can end.

In sum, the class loader bridge can recursively bridge arguments passed across the class loading boundary, and can return the types of each method call. Objects can be proxied across the class loading boundary which objects can be wrapped with an invocation handler that invokes the class loader bridge as part of any method invocations. Thus the class loading bridge can be defined using recursion with two potential base cases: passing a base type across the bridge unaltered or serializing the object across the bridge. The recursive case uses dynamic proxies to proxy the objects transported in both directions until the objects have all reached an object that conforms to the base case.

Additionally, the class loader bridge can dynamically handle an arbitrary set of types at runtime. In this regard, the library of the class loader bridge can derive the class relationships and the resulting rules for bridging an object from source and destination class loaders at runtime. Notably, the foregoing bridging methodology can be applied to any programming language that dynamically loads and resolves object types at runtime. The class loader bridge thus enables the re-use of large existing code bases without modification, while underlying performance enhancements can be made by collocating originally distributed services within the same virtual machine, thus eliminating the need for inter-process communications.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for bridging class loader name spaces comprising:
    a plurality of different class loaders disposed within a single run-time environment; and,
    a class loader bridge executing in memory by a processor of the data processing system and programmed to moderate access to said different class loaders in response to a request to load an object from one of two programming models containing objects concurrently in said single run-time environment.

2. The data processing system of claim 1, wherein said run-time environment is a Java virtual machine (JVM).

3. The data processing system of claim 1, wherein said programming models comprise a Java 2 Enterprise Edition (J2EE) container and an Eclipse tools platform.

4. The data processing system of claim 1, wherein said class loader bridge is programmed to proxy objects across a class loader boundary between different ones of said class loaders disposed in said run-time environment.

5. The data processing system of claim 1, wherein said class loader bridge is defined using recursion by one of passing an object having a base type across said class loader bridge unaltered and by serializing said object across said class loader bridge.

6. The data processing system of claim 4, further comprising an invocation handler coupled to said class loader bridge and programmed to invoke said class loader to bridge arguments to a method in an object proxied by the class loader bridge.

7. In a run-time environment, a method for bridging class loader name spaces comprising the steps of:
   receiving a request to load an object in the run-time environment;
   identifying a type for said object; and,
   selecting a class loader from among a plurality of class loaders based upon said identified type in the run-time environment to process said request.

8. The method of claim 7, wherein said selecting step comprises the step of recursively passing said object unaltered across a class loader boundary where said identified type is a type loaded by a shared parent class loader.

9. The method of claim 7, wherein said selecting step comprises the steps of:
   serializing said object across a class boundary; and,
   de-serializing said object in a selected class loader.

10. The method of claim 7, wherein said selecting step comprises the steps of:
    determining if said object is proxiable across a class loading boundary between said class loaders; and,
    if it is determined that said object is proxiable, proxying access to said object from one namespace for one of said class loaders to another namespace for another of said class loaders.

11. The method of claim 10, wherein said determining step comprises the step of determining if said object implements a common interface that can be resolved within each of said class loaders.

12. A computer program product comprising a computer usable medium including computer usable program code for bridging class loader namespaces, said computer program product including:
    computer usable program code for receiving a request to load an object in the run-time environment;
    computer usable program code for identifying a type for said object; and,
    computer usable program code for selecting a class loader from among a plurality of class loaders based upon said identified type in the run-time environment to process said request.

13. The computer program product of claim 12, wherein said computer usable program code for selecting a class loader comprises computer usable program code for recursively passing said object unaltered across a class loader boundary where said identified type is a type loaded by a shared parent class loader.

14. The computer program product of claim 12, wherein said computer usable program code for selecting a class loader comprises:
    computer usable program code for serializing said object across a class boundary; and,
    computer usable program code for de-serializing said object in a selected class loader.

15. The computer program product of claim 12, wherein said computer usable program code for selecting a class loader comprises:
    computer usable program code for determining if said object is proxiable across a class loading boundary between said class loaders; and,
    computer usable program code for proxying access to said object from one namespace for one of said class loaders to another namespace for another of said class loaders if it is determined that said object is proxiable.

16. The method of claim 15, wherein said computer usable program code for determining if said object is proxiable comprises computer usable program code for determining if said object implements a common interface that can be resolved within each of said class loaders.

* * * * *